May 3, 1960     H. R. SUMMERHAYES, JR     2,935,617
FUNCTION GENERATOR
Filed March 29, 1955
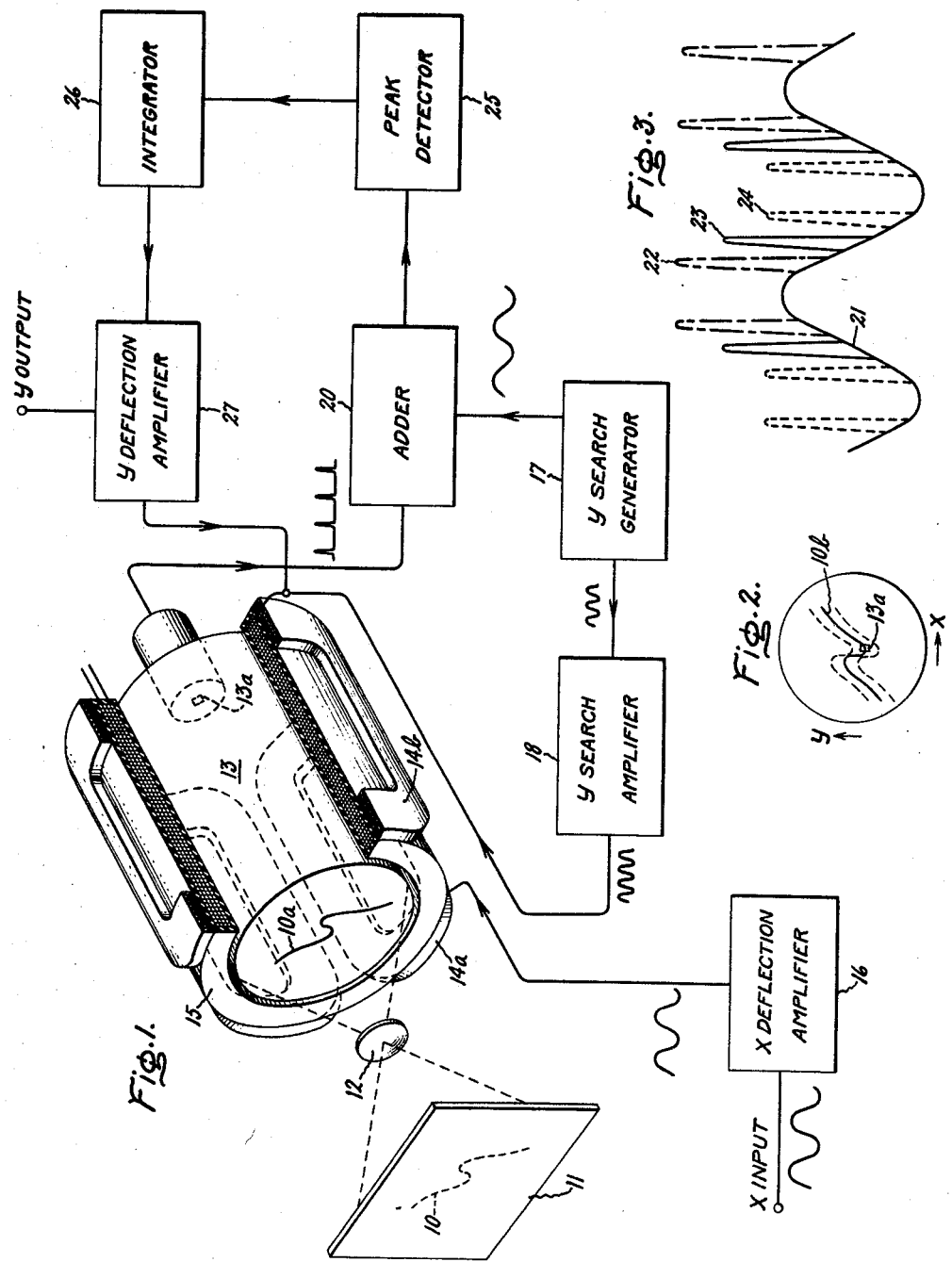
Inventor:
Harry R. Summerhayes, Jr.
by Merton D. Mo——
His Attorney.

United States Patent Office 2,935,617
Patented May 3, 1960

2,935,617
FUNCTION GENERATOR

Harry R. Summerhayes, Jr., Schenectady, N.Y., assignor to General Electric Company, a corporation of New York Application March 29, 1955, Serial No. 497,696

6 Claims. (Cl. 250—217)

This invention relates to function generators of the analog type, and more particularly to a function generator of that type in which an output electrical signal varies as a function of an input electrical signal.

A primary object of the present invention is to provide a function generator of the analog type that is inherently capable of high speed operation, whereby it is suitable as a component of modern high speed computing devices.

Another object is to provide such apparatus in which an output electrical signal can vary as any desired function of an input electrical signal, and in which the function may be changed without making adjustments in the circuitry of the apparatus.

A further object of the invention is to provide an analog function generator that is essentially completely electronic in character and embodies conventional electronic components.

A function generator of the analog type constructed in accordance with the present invention may comprise an image dissector cathode ray device on the photosensitive cathode of which is focused an image of a curve representing the function to be generated. The image of the curve is rapidly scanned in a transverse direction at a relatively high rate of speed, and the input signal whose function is to be generated determines the location of the scan along the image of the curve.

Each time the image of the curve is crossed, a pulse is generated by the image dissector device, and the train of pulses is then superimposed on the high speed scanning or search signal. If the high speed scan is centered on the image of the curve, the pulses are evenly spaced along the search signal waveform and no output is obtained from a detector into which the signals are connected. However, if the pulses are not evenly spaced along the search signal waveform, which may be caused by the high speed scan not being centered on the image of the curve, an output signal will be obtained from the detector. That signal, which may be either positive or negative depending on whether the high speed scan is centered above or below the image of the curve, is then integrated to provide a deflection signal to center the high speed scan on the image of the curve. The deflection signal also provides an output signal, which varies as the desired function of the input signal.

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawing in which:

Fig. 1 is a block diagram of a function generator constructed in accordance with the invention;

Fig. 2 is a diagram showing the scanning pattern of the image dissector device; and Fig. 3 is a diagram of wave shapes useful in understanding the operation of the apparatus of the invention.

The apparatus of the invention is adapted to provide an output voltage, hereafter referred to as the Y voltage, which varies as a function of an input signal, hereafter referred to as the X signal; that is, the apparatus of the invention operates in accordance with the equation $Y=f(X)$. As seen in Fig. 1, a curve 10 representing the equation $Y=f(X)$ may be produced by conventional means on a support 11, such as a sheet of paper or other material, having X and Y coordinates. An image 10a of the curve 10 is focused by a lens 12 on the photosensitive cathode of an image dissector cathode ray device 13.

The image dissector device 13, which is shown diagrammatically, is of conventional type well known in the television art. Such devices include a photosensitive cathode from which photoelectrons are emitted due to an optical image focused thereon. The emitted electrons are focused by means of an axial magnetic field to form an electron image in the plane of an aperture 13a behind which is an electron sensitive device such as an electron multiplier. The electron image is deflected horizontally and vertically by magnetic fields so that the motion of the electron image past the aperture results in scanning the electron image by progressively selecting areas thereof corresponding to respective areas of the original optical image. The output of the electron sensitive device behind the aperture at any instant is proportional to the brightness of the area of the image being scanned at that instant. A number of image dissector devices and their operation are described in an article entitled "The Image Dissector" by C. C. Larson and B. C. Gardner, published in Electronics magazine, October 1939. Of course, the present invention is not limited to the use of any particular device or any particular construction thereof.

Referring again to Fig. 1, the image dissector 13 is shown as provided with deflection coils 14a and 14b and focusing coils 15. The X input signal may be supplied to a conventional deflection amplifier 16, the output of which provides current for the deflection coil 14a of the image dissector device 13 to create the necessary magnetic field to position the electron image of the curve in the X direction, which may be horizontal, relative to the image dissector aperture. Voltage may be supplied to the focusing coils 15 and other parts of the image dissector device from a conventional regulated power supply (not shown), and the necessary voltages for the other elements of the apparatus to be hereafter described may also be provided from that power supply.

A cyclically recurring signal of sinusoidal, triangular or other waveform suitable for scanning purposes, hereafter referred to as the Y search signal, is generated by a conventional sweep generator 17. The Y search signal is connected to the image dissector deflection coil 14b through an amplifier 18 to create the necessary magnetic field to cause the electron image of the curve 10 to be moved rapidly back and forth in the Y direction, which may be vertical, or at right angles to the X direction, across the aperture of the image dissector device. The Y search signal preferably is of a frequency high compared to the maximum frequency of the X input signal; for example, if the X input signal has a maximum frequency of 100 c.p.s., the Y search signal frequency may conveniently be of the order of 50,000 c.p.s., although these values are in no sense limiting.

Fig. 2 illustrates diagrammatically the scanning pattern of the image dissector device 13 with curve 10b representing the electron image of the curve 10a focused on the photosensitive cathode of the image dissector device. The Y search signal causes the electron image 10b of the curve to sweep back and forth along the Y coordinate (vertically, in this case) across the image dissector aperture 13a with a sweep of substantially constant amplitude and relatively high frequency. The curves shown in broken lines indicate the limits of the Y scan in a particular case, although the limits may be varied as necessary by adjusting the amplitude of the Y search signal. The X input signal causes the electron image to move lengthwise of the curve (horizontally, in this case) along the X coordinate. In other words, the Y search signal causes the curve to be scanned transversely in the Y direction, and the X input signal controls the X position of the Y search scan along the curve. As illustrated, the amplitude of the Y search scan is relatively small. However, as will be later discussed, it may be desirable to increase the amplitude of the Y search signal to cause the electron image to scan increased distances on each side of the curve.

Referring again to Fig. 1, as the Y search signal causes the electron image to scan rapidly back and forth across the image dissector aperture, a momentary output signal in the form of a pulse is produced by the image dissector device 13 each time the electron image of the curve 10 falls on the aperture. It is assumed that the curve 10 on its support 11 is so formed and illuminated that its image on the photosensitive cathode of the image dissector device is of uniform intensity, and thus all of the output pulses from the device are of the same amplitude. This operation is in accordance with the well known principles of the image dissector device. The image dissector output pulses are connected to one input and the Y search signal is connected to another input of an electronic adding circuit 20, which operates to superimpose the image dissector output pulses on the Y search signal. Such adding circuits are conventional and well known in the art.

The image dissector output pulses and the Y search signal may be added together with various phase relationships depending on the degree of symmetry of the Y search scan relative to the electron image of the curve. Several examples of these relationships are shown in Fig. 3, where the curve 21 represents the Y search signal and the curves 22, 23 and 24 represent image dissector output pulses occurring under various conditions. If the Y search scan is not symmetrical about the electron image of the curve, the positions of the output pulses will be as shown by the curves 22 and 24. For example, if the Y search scan is centered below the image of the curve, the image dissector output pulses occur near the positive peak of each scanning cycle and correspond to the pulses 22. Conversely, if the Y search scan is centered above the image, the output pulses occur near the negative peak of each scanning cycle and correspond to the pulses 24. When the Y search scan is properly centered on the electron image of the curve, the image dissector output pulses occur at the mid-point or zero crossing of each scanning cycle and correspond to the pulses 23.

The output of the adding circuit 20 is connected into a peak detector 25 of conventional design, which operates to produce a direct current output signal in accordance with the peak values of the input signals, and the phase of the image dissector output pulses relative to the Y search voltage on which they are superimposed determines the level of the direct current output of the peak detector. If the Y search scan is not centered on the electron image of the curve in the image dissector device, the output of the peak detector is either more or less than its output level when the search scan is properly centered. Thus, by connecting a reference signal into the peak detector which is equal in amplitude but opposite in polarity to the output of the detector when the scan is properly centered, the detector output signal may be made to be either positive or negative by an amount depending upon the displacement of the center of the Y search scan from the image of the curve in the image dissector device. Such detectors are well known in the art, and a detailed explanation of their operation is deemed unnecessary.

The output of the peak detector 25 is integrated in order to provide a Y deflection signal that will properly center the Y search scan on the electron image of the curve representing the function to be generated. This operation is performed by a conventional electronic integrator 26 into which the output of the peak detector 25 is connected, and the output of the integrator 26 is amplified by a conventional direct current amplifier 27 to provide a Y deflection signal that is connected to the deflection coil 14b of the image dissector device 13. The Y deflection signal varies as the desired function of the X input signal and thus provides the Y output signal.

It is now apparent that apparatus constructed in accordance with the invention fulfills the objectives set forth and provides a device having several outstanding features. The function generator acts in accordance with well known null-seeking servo principles to provide a device that is characterized by high speed operation. Any deviation of the midpoint or center of the high speed Y search scan from the image of the curve representing the function to be generated immediately produces an output from the detector 25. Thus the Y deflection signal varies as the desired function of the X input signal with practically instantaneous response to a change in the X input signal.

If the function to be reproduced has relatively large or sudden variations therein, the amplitude of the Y search signal may be increased as necessary to cause the image dissector device to scan farther above and below the electron image of the curve and thus more easily follow the variations in the curve. When starting operation of the apparatus, the Y search scan might be adjusted to cover the entire width of the electron image of the photosensitive cathode. Then, when the scan has "locked in" on the curve, the amplitude of the scan may be reduced. The operation of the apparatus of the invention remains as previously described regardless of the amplitude of the Y search scan.

The curve 10, which determines the function to be generated, may be easily drawn or printed on a support. A number of curves may be drawn on separate supporting sheets and the desired curve for the particular application placed in position to be imaged on the photosensitive cathode of the image dissector tube.

With the exception of the curve 10, the apparatus is completely electronic in character, and all of the components are conventional well known electronic devices that are readily available commercially.

While a particular embodiment of the invention has been illustrated, it will, of course, be understood that the invention is not limited thereto, since various modifications may be made. It is contemplated by the appended claims to cover any such modifications as fall within the true spirit and scope of the invention.

What I claim as new and desire to secure by Letters Patent of the United States is:

1. A function generator for producing an output signal that varies as a function of an input signal comprising means for producing an image of a curve representing the desired function, scanning means for scanning said image and producing momentary electrical signal pulses each time said image is intercepted, first deflection means for causing said image to be scanned in a direction corresponding to the output signal coordinates thereof, signal generator means for producing a cyclically recurring deflection signal connected to said first deflection means, second image deflecting means connected to receive said input signal for causing said image to be scanned in a direction transverse to said output signal coordinate, and output circuit means connected to receive said momentary electrical signal pulses and for producing a variable output signal whose polarity and amplitude are related to the excursions of said scanning means over said image, said output circuit means being connected back to said first deflection means in conjunction with said signal generator to center the scanning of said image in the direction of the output signal coordinate.

2. A function generator for producing an output signal that varies as a function of an input signal comprising means for producing an electron image of a curve representing said function, scanning means positioned to intercept said electron image and produce an electrical pulse each time said image is intercepted, generator means for producing a cyclically recurring signal, a first image deflecting means connected to receive said cyclically recurring signal whereby said electron image is deflected past said scanning means in a direction corresponding to the output signal coordinate thereof, a second image deflecting means connected to receive said input signal for deflecting said electron image past said scanning means in a direction corresponding to the input signal coordinate, adding means connected to receive said momentary electrical pulse and said cyclically recurring signal whereby said signals are added, peak detecting means connected to receive said added signals for producing a direct current electrical signal whose polarity and amplitude are related to the peak amplitude of said sum signal, and integrating means connected to receive the output of said peak detecting means for producing said output signal, said first image deflecting means being coupled to receive said output signal.

3. A function generator for producing an output electrical signal that varies as a function of an input electrical signal comprising means for producing an electron image of a curve representing said function, scanning means positioned to intercept said electron image and produce an electrical pulse each time said image is intercepted, generator means for producing a cyclically recurring electrical signal, a first image deflecting means connected to receive said cyclically recurring signal whereby said electron image is deflected past said scanning means in a direction corresponding to the output signal coordinate thereof, a second deflecting means connected to receive said input signal for deflecting said electron image past said scanning means in a direction corresponding to the input signal coordinate, adding means connected to receive said electrical pulses and said cyclically recurring electrical signal whereby said pulses and said signals are added to produce a sum signal, peak detecting means connected to receive said sum signal for producing a direct signal whose polarity and amplitude are related to the peak amplitude of said sum signal, integrating means connected to the output of said peak detecting means for integrating said direct signals to produce said output electrical signal, said first image deflecting means being connected to receive said output signal whereby said output signals and said cyclically recurring signal are added.

4. A function generator for producing an output electrical signal that varies as a function of an input signal comprising a cathode ray device having a photosensitive cathode for producing an electron image by electron emission from said cathode, optical means for forming on said cathode an optical image of a curve representing the function to be generated, means for producing a cyclically recurring electrical signal, scanning means positioned to intercept said electron image and produce an electrical pulse each time said image is intercepted, a first image deflecting means in said cathode ray device connected to receive said cyclically recurring signal and deflect said electron image past said scanning means in a direction corresponding to the output signal coordinate thereof, a second image deflecting means in said cathode ray device connected to receive said input signal for deflecting said electron image past said scanning means in a direction corresponding to the input signal coordinate, adding means connected to receive and add said electrical pulses and said cyclically recurring signal to produce a sum signal, peak detecting means connected to receive the said sum signal for producing a direct current signal whose polarity and amplitude are related to the peak value of said sum signal, integrating means for integrating said direct current signal to produce said output electrical signal, said first image deflecting means being connected to receive said output electrical signal whereby said output electrical signal and said cyclically recurring signal are added.

5. In a function generator for producing an output electrical signal that varies as a function of an input electrical signal, means for producing an electron image of a curve representing said function, scanning means positioned to intercept said electron image and produce an electrical pulse each time said image is intercepted, a pair of image deflecting means for deflecting said electron image past said scanning means in directions which are at right angles, one of said pairs of image deflecting means being connected to receive a cyclically recurring signal, the other one of said image deflecting means being connected to receive said input signal, adding means connected to receive said electrical pulses and the cyclically recurring signal whereby a signal is produced which represents the summation of said cyclically recurring signal and said electrical pulses, circuit means connected to receive said summation electrical signal for producing an output signal which represents the volt-time integral of the peak voltages of said summation electrical signal, and means connected between said one of said pairs of image deflecting means and said circuit means for impressing said output signal.

6. A function generator for producing an output signal that varies as a function of an input signal comprising means for producing an electron image of a curve representing said function, scanning means to intercept said electron image and produce a momentary electrical signal each time said image is intercepted, generator means for producing a cyclically recurring signal, means to cause said electron image to be scanned by said scanning means, said means being connected to receive said cyclically recurring signal and said input signal, adding means connected to receive said momentary electrical signals and said cyclically recurring signal whereby said signals are added, circuit means connected to receive said added signals for producing said output signal, and impressing said output signal upon said cyclically recurring signal.

References Cited in the file of this patent

UNITED STATES PATENTS

| | | |
|---|---|---|
| 2,061,113 | Sukumlyn | Nov. 17, 1936 |
| 2,462,263 | Haynes | Feb. 22, 1949 |
| 2,474,380 | Simmon | June 28, 1949 |
| 2,497,042 | Doll | Feb. 7, 1950 |
| 2,545,331 | Works | Mar. 13, 1951 |
| 2,557,691 | Rieber | June 19, 1951 |
| 2,656,101 | Haviland | Oct. 20, 1953 |
| 2,868,993 | Henry | Jan. 13, 1959 |

FOREIGN PATENTS

| | | |
|---|---|---|
| 639,247 | Great Britain | June 21, 1950 |